United States Patent [19]

Crawford

[11] 4,096,361

[45] Jun. 20, 1978

[54] TEST APPARATUS FOR OBTAINING IMPEDANCE SETTINGS FOR HYBRID BALANCE NETWORKS

[75] Inventor: Charles David Crawford, Burlington, N.C.

[73] Assignee: Bell Telephone Laboratories, Incorporated, Murray Hill, N.J.

[21] Appl. No.: 808,092

[22] Filed: Jun. 20, 1977

[51] Int. Cl.$^2$ .............................................. H04B 1/52
[52] U.S. Cl. ................................................. 179/170 D
[58] Field of Search ................................... 179/170 D

*Primary Examiner*—George G. Stellar
*Attorney, Agent, or Firm*—Thomas Stafford

[57] ABSTRACT

Impedance settings are obtained automatically for manually adjusting a network to obtain a driving point impedance substantially equal to a particular unknown impedance. Discrete impedance settings for setting up, for example, a manually adjustable hybrid balance network are obtained by employing a hybrid network, a noise signal source, at least first and second automatically adjustable balance networks and at least first and second control circuits. An impedance to be matched, for example, a 2-wire telephone cable, is connected to the hybrid. Signals detected at the cable and at the inputs to the respective balance networks are employed to generate control signals for adjusting impedance elements in the automatically adjustable balance networks. Impedance elements in the first balance network are continuously adjusted to match substantially exactly the impedance of the cable. Then, the most sensitive of the corresponding control signals is rounded off to a discrete value and supplied to adjust a corresponding discretely adjustable impedance element in the at least second adjustable balance network. The second control circuit then generates signals for adjusting the remaining impedance elements in the second balance network to obtain the most optimum driving point impedance to match the cable impedance. Values of the impedance control are displayed in binary form to be used by a craftsperson for setting up a corresponding manually adjustable balance network to match the particular cable connected to the hybrid.

11 Claims, 12 Drawing Figures

TEST APPARATUS FOR OBTAINING IMPEDANCE SETTINGS FOR HYBRID BALANCE NETWORKS

BACKGROUND OF THE INVENTION

This invention relates to adjustment of impedance values and, more particularly, to a test set for generating impedance value settings to adjust a network to yield a desired driving point impedance.

Hybrid networks are commonly used in bidirectional signal transmission systems to couple signals from a bidirectional transmission path to incoming and outgoing unidirectional transmission paths, a typical example being in coupling a 2-wire telephone bidirectional transmission cable to a 4-wire telephone transmission arrangement including two unidirectional cables. As is well known, in such arrangements it is necessary to balance the hybrid network by employing an impedance network which has a driving point impedance substantially equal to the impedance of the bidirectional transmission cable. Otherwise low transhybrid loss results which, in turn, typically results in unwanted signal reflections.

Bidirectional transmission cables of various lengths are employed in communications systems and, therefore, present a wide range of impedances. Consequently, it has been necessary to provide a precision hybrid balance network including various manual adjustments in order to generate a driving point impedance which matches the impedance of the particular bidirectional cable being connected to the hybrid network. Heretofore, such manual adjustments have relied heavily on knowledge of the characteristics of the particular bidirectional transmission cable being connected to the hybrid. Needless to say, such knowledge is not always readily available and is not always accurate.

More recently, computer programs have been developed which simulate the characteristics of the particular bidirectional cable to be connected to the hybrid and generate the desired impedance settings for the balance network. Here again, precise knowledge of the transmission cable characteristics is required to obtain optimum inpedance settings.

It has also been proposed to eliminate the need for manual adjustment of the balance networks by employing automatic balancing arrangements which continuously adjust impedance elements to effect an optimum match to the cable impedance. For the most part these continuously adjustable networks are expensive and, therefore, not practical for widespread use from an economic standpoint.

SUMMARY OF THE INVENTION

These and other problems related to the adjustment of impedance networks are overcome by employing the principles of the invention to be described herein in a test set which automatically yields impedance setting values for manually adjusting hybrid balance networks to match the impedance of a cable connected to the hybrid.

Impedance settings for adjusting a balance network having a plurality of adjustable impedance elements are obtained by employing a hybrid network to which a bidirectional cable to be matched is to be connected in conjunction with at least first and second automatically adjustable impedance balance networks in a prescribed circuit relationship. A test signal having one or more frequency components in a frequency band of interest is supplied to a predetermined port of the hybrid network. At least first and second control circuits are associated with the at least first and second automatically adjustable balance networks, respectively. The first control circuit responds to signals detected at the hybrid connection to the bidirectional cable and at the hybrid connection to the at least first balance network to generate a plurality of control signals for adjusting corresponding impedance elements in the first balance network for matching the impedance of the bidirectional cable over a frequency band of interest. A predetermined one of the impedance control signals generated by the first control circuit is rounded off in a prescribed manner to a discrete value, for example, in binary form, and supplied to adjust a corresponding impedance element adjustable in discrete steps in the at least second adjustable balance network. A signal substantially equal to the input to the first balance network from the hybrid is supplied to the second adjustable network. Because of interaction of the several impedance adjustments the remaining impedances in the second balance network must be adjusted to be different than those employed to adjust the first balance network in order to obtain the optimum adjustment when using impedances adjustable in discrete steps. To this end, the at least second control circuit responds to the signal detected at the hybrid connection to the bidirectional cable and to the input to the second adjustable balance network to generate control signals for continuously adjusting the remaining ones of the impedance elements other than the most sensitive element in the at least second adjustable balance network to match the cable impedance. The values of the remaining ones of the impedance elements are rounded off in a prescribed manner. All of the rounded off values are employed as desired, for example, to yield a visual display of the impedance settings.

This technique is expandable to adjust as many variables as desired to yield discrete impedance settings for adjusting impedance networks to match particular load impedances. For example, a test set including three automatic adjustable balance networks may be employed to generate settings for adjusting a balance network having three variables, while a test set including two automatic adjustable balance networks may be employed to generate settings for adjusting a balance network having two variables.

BRIEF DESCRIPTION OF THE DRAWINGS

These and other objects and advantages of the invention will be more fully understood from the following detailed description taken in accordance with the appended drawings in which.

DETAILED DESCRIPTION

Figure 1:
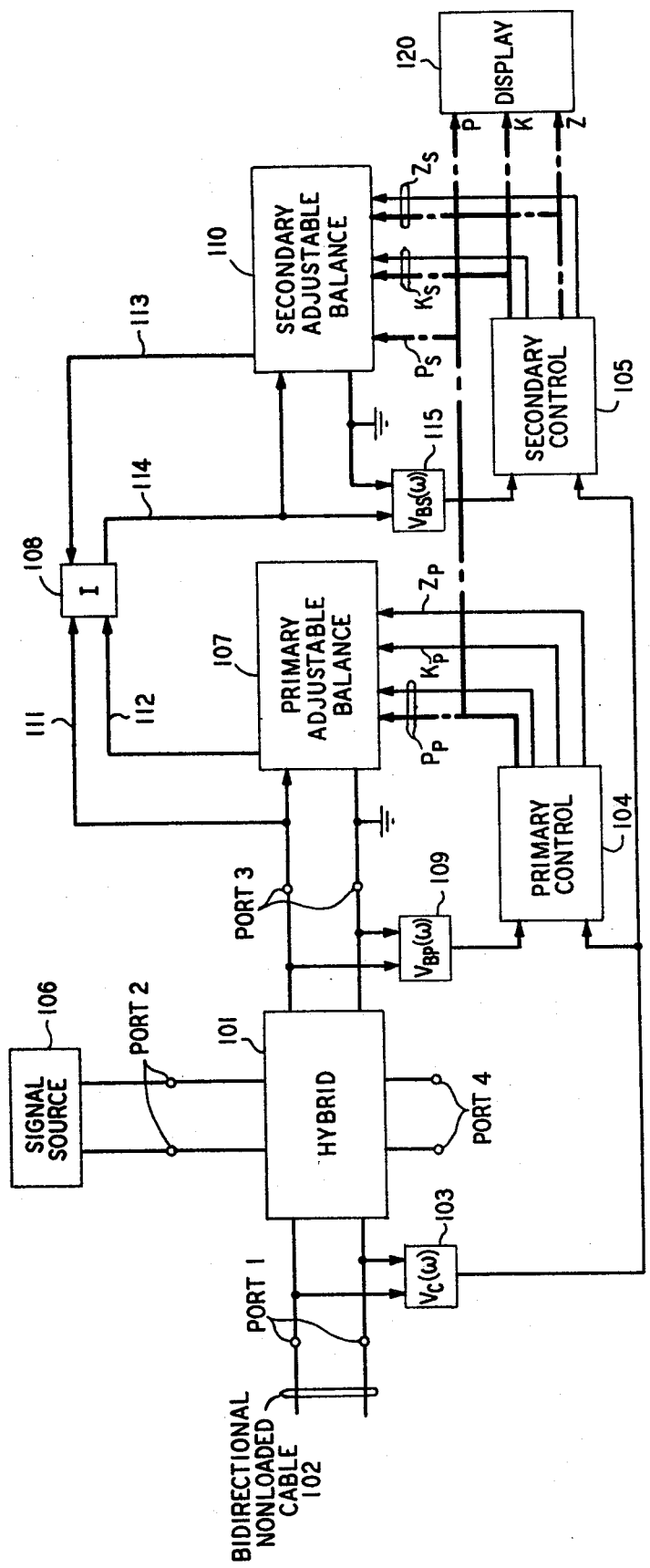
FIG. 1 shows in simplified block diagram form one embodiment of the invention for yielding impedance settings for networks having three variables.

As is known, the impedance of a bidirectional transmission path, for example, a 2-wire telephone cable or the like, is complex and, therefore, is dependent on the frequency of applied signals. Thus, the cable impedance includes both magnitude and phase components which vary as the frequency varies. In practice, it is desirable to design or adjust a balance network to yield a driving point impedance which will best match the cable impedance and, hence, yield the greatest return loss between cable impedance $Z_C$ and balance network impedance $Z_B$ over the entire frequency band of interest and not necessarily at a single frequency.

Any such balance network should be capable of being adjusted to match various cable lengths and, hence, various impedance values experienced in typical telephone plants. To this end, a number of manually adjustable balance networks have been designed. Two such balance networks, one for non-loaded telephone cable and the other for loaded telephone cable, are disclosed and described in U.S. Pat. No. 3,919,502, issued to G. T. Daryanani on Nov. 11, 1975. The Daryanani balance networks include adjustable impedances for matching the balance networks to various cable lengths that may be connected to a hybrid network. For convenience and "ease" of adjustment the impedance values are varied in discrete binary steps by employing toggle or rocker switches. Consequently, the impedance values are not continuously adjustable and are related in discrete steps.

In my copending application Ser. No. 808,091 filed June 20, 1977 it is shown that control signals for adjusting corresponding impedance elements to obtain optimum values for continuously adjustable balance networks of the Daryanani type are realizable and may be expressed $$K: \int_{\omega_1}^{\omega_2} \left[ \left| \vec{V}_C(\omega) \right| - \left| \vec{V}_B(\omega) \right| \right] d\omega = 0 \quad (1)$$

$$Z: \int_{\omega_1}^{\omega_2} \left[ \left[ \left| \vec{V}_C(\omega) \right| - \left| \vec{V}_B(\omega) \right| \right] W_1 - \kappa V_1 \theta(\omega) W_2 \right] d\omega = 0 \quad (2)$$

$$P: \int_{\omega_1}^{\omega_2} \left[ \left[ \left| \vec{V}_C(\omega) \right| - \left| \vec{V}_B(\omega) \right| \right] W_3 - \kappa V_1 \theta(\omega) W_4 \right] d\omega = 0 \quad (3)$$

where $W_1 = Z/(\omega^2 + Z^2)$, $W_2 = \omega/(\omega^2 + Z^2)$, $W_3 = P/(\omega^2 + P^2)$, $W_4 = \omega/(\omega^2 + P^2)$, K represents an adjustable scalar multiplier, Z represents an adjustable zero, i.e., an admittance function singularity, P represents an adjustable pole, i.e., an impedance function singularity, $\vec{V}_C(\omega)$ is a signal detected at the cable connection to a hybrid network $\vec{V}_B(\omega)$ is the signal detected at the input to a balance network and $\theta(\omega)$ is the phase angle between $\vec{V}_B(\omega)$ and $\vec{V}_C(\omega)$. Equations 1 through 3 apply to a 4-port hybrid with a bidirectional cable connected to port 1, a test signal source for generating $V_1$ having a prescribed output impedance of approximately zero connected to port 2, a balance network connected to port 3 and a prescribed terminating impedance of infinite impedance, i.e., an open circuit, connected to port 4. It is noted that the optimizing functions for Z and P, namely equations 2 and 3, respectively, include both magnitude and phase components.

A problem, however, with manually adjustable networks of the Daryanani type is the fact that the impedances are adjustable in discrete steps. Consequently, the values generated for adjusting continuously adjustable impedance elements to obtain a desired balance, for example, as described in my copending application noted above, must be rounded off in a prescribed manner to the nearest discrete values. If this is done, however, the resulting values do not necessarily result in optimum adjustment of the corresponding impedance elements in a manually adjustable balance network because of their interaction. Consequently, the hybrid would not be properly mateched to the bidirectional cable.

To overcome this problem, I have found that the most sensitive of the primary balance network impedance control signals may be rounded off in a prescribed manner and then used to adjust a corresponding impedance element in a secondary balance network. Then, readjustment of the remaining impedance elements in the secondary balance network, which may also then be rounded off in a prescribed manner, yields satisfactorily settings for use in practice. If it is desired to obtain settings more closely approaching the optimum values a third, or more balance networks may be employed depending on the number of variables to be adjusted. Then, the procedure is to adjust the first balance network to the optimum settings, round off the most sensitive control signal and supply it to adjust in discrete fashion corresponding impedance elements in all subsequent balance networks. Supply a signal to the subsequent balance networks substantially equal to the signal supplied from the hybrid to the first balance network. In conjunction with the second control, adjust the remaining variables of a second balance network to obtain balance with the rounded off most sensitive control signal and round off the next most sensitive control signal. The rounded off next most sensitive control signal is then supplied to all subsequent balance networks to adjust in discrete fashion corresponding impedance elements. This process is iterated for the remaining control signals. When reference is made to the most sensitive control signal or impedance setting, it is meant that control signal or impedance setting which is most affected by changes in the other impedance controls or settings. For example, in a balance network of the Daryanani type for non-loaded cable including an adjustable scalar multiplier, adjustable zero and adjustable pole, it has been determined that the pole control is most sensitive to adjustments of the other controls and that the scalar multiplier is least sensitive.

Figure 3:
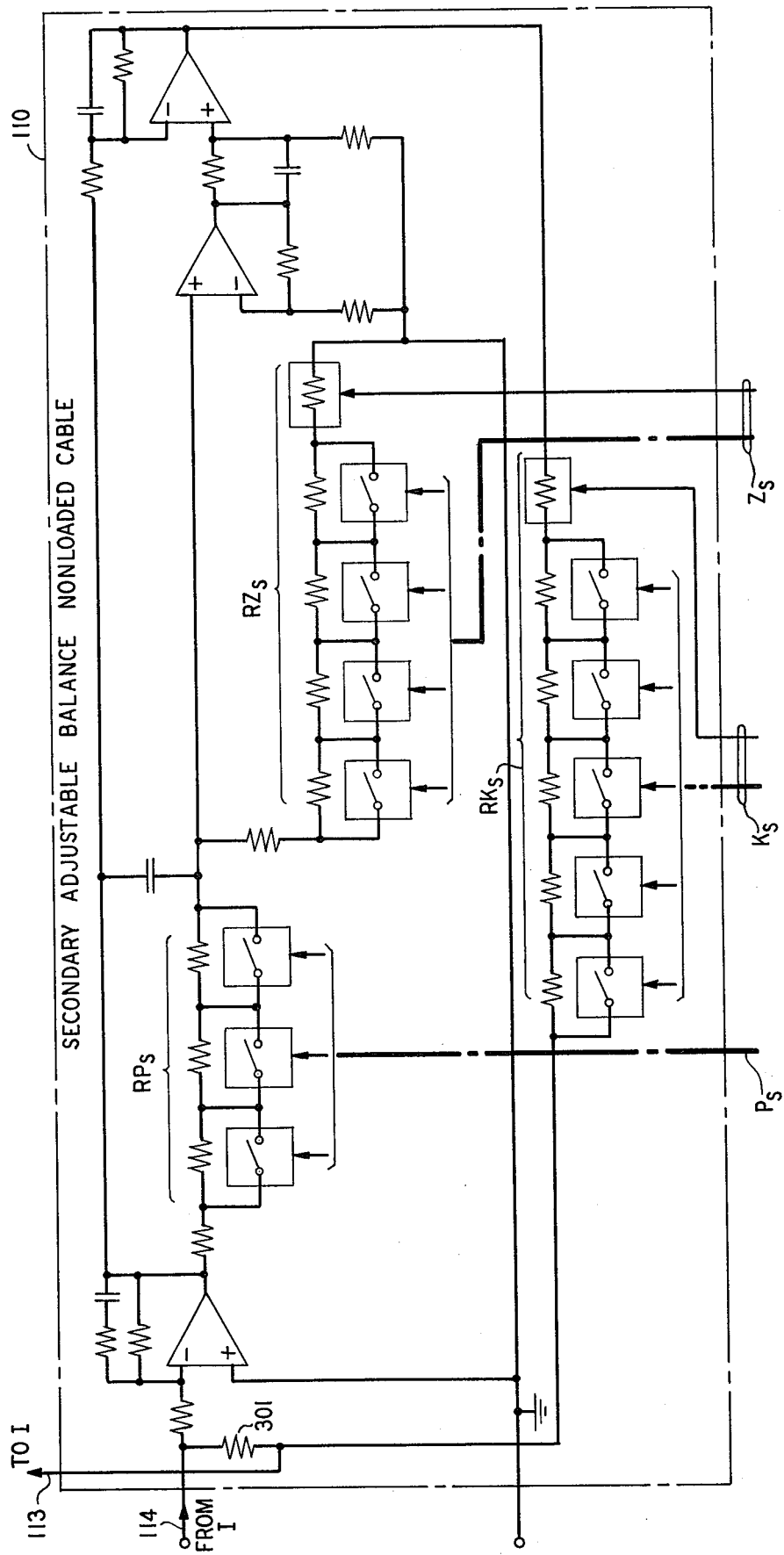
FIG. 3 shows details of the secondary adjustable balance network of FIG. 1 for non-loaded cable.

FIG. 1 shows in simplified block diagram form details of one embodiment of the invention for yielding discrete impedance settings to adjust satisfactorily a balance network having three adjustable impedance parameters, for example, adjustable scalar multiplier K, adjustable real pole P, and adjustable real zero Z. One such balance network is shown in FIG. 3 of the Daryanani patent cited above.

Accordingly, shown in FIG. 1 is a 4-port hybrid network 101 which may be of the transformer type now well known in the art. Port 1 of hybrid 101 is adapted to be connected to bidirectional cable 102 having an "unknown" impedance and is connected via sensing circuit 103 to primary control 104 and secondary control 105. Sensing circuit 103 is employed to detect signal $V_C(\omega)$ developed at port 1 of hybrid 101 and may simply be a transformer and a bandpass filter to limit $V_C(\omega)$ to a frequency band of interest, for example, the voice frequency band of approximately 250 Hz to 3600 Hz. Signal source 106 is connected to port 2 of hybrid 101. Signal source 106 has a prescribed output impedance of approximately zero and yields a signal having one or more frequency components in a band of interest. In this example, signal source 106 includes a noise signal generator having frequency components in at least the frequency band of approximately 250 Hz to 3600 Hz. Port 3 of hybrid 101 is connected to primary adjustable balance network 107, to current control (I) 108 via circuit path 111, and to sensing circuit 109. Sensing circuit 109 is employed to detect signal $V_{BP}(\omega)$ developed at the input to primary balance network 107 and it also includes a coupling transformer and a bandpass filter to limit $V_{BP}(\omega)$ to the desired voice frequency band of approximately 250 Hz to 3600 Hz. Port 4 of hybrid network 101 is terminated in a predetermined impedance, for example, an infinite impedance, as indicated by the open circuit connection.

Current control 108 is employed to insure that a signal supplied to secondary adjustable balance network 110 is substantially equal to the signal supplied from hybrid 101 to primary adjustable network 107 and further to isolate secondary balance network 110 from hybrid 101. To this end, current control 108 responds to the signal supplied to primary balance network 107 from port 3 of hybrid 101, a signal developed in primary balance network 107 supplied via circuit path 112, and a signal developed in secondary balance network 110 supplied via circuit path 113, to regulate a signal supplied to secondary balance network 110 and to sensing circuit 115 via circuit path 114.

Figure 4:
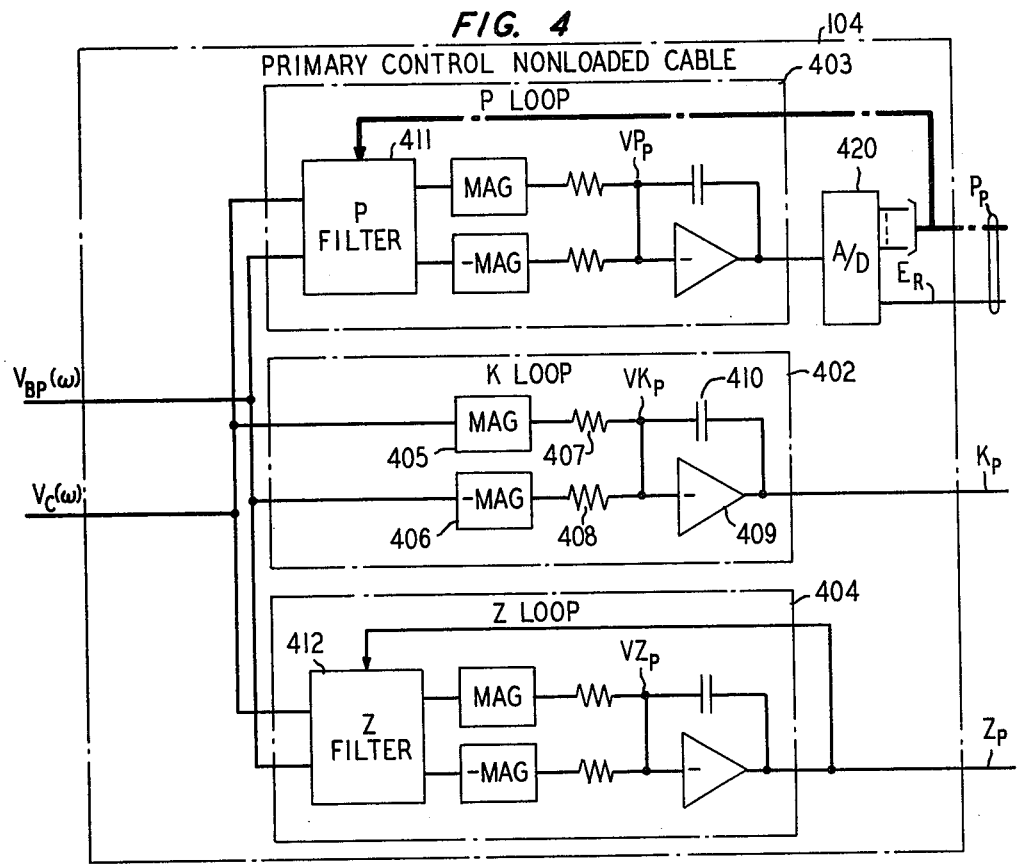
FIG. 4 shows details of the primary control circuit of FIG. 1 for non-loaded cable.

Primary control 104 responds to signal $V_C(\omega)$ developed at port 1 of hybrid 101 and signal $V_{BP}(\omega)$ developed at port 3 of hybrid 101 to generate a plurality of control signals for continuously adjusting corresponding impedance elements in primary adjustable balance network 107 to yield a driving point impedance which substantially matches the complex impedance of bidirectional cable 102 connected to port 1 of hybrid 101. To this end, primary control 104 yields control signals $P_P$, $K_P$ and $Z_P$. Control signal $K_P$ adjusts an impedance element corresponding to a scalar multiplier, i.e., a gain function, control signal $Z_P$ adjusts an impedance element corresponding to a real zero and control signal $P_P$ adjusts an impedance element corresponding to a real pole. Details of primary control 104 are shown in FIG. 4 and will be discussed below.

Figure 2:
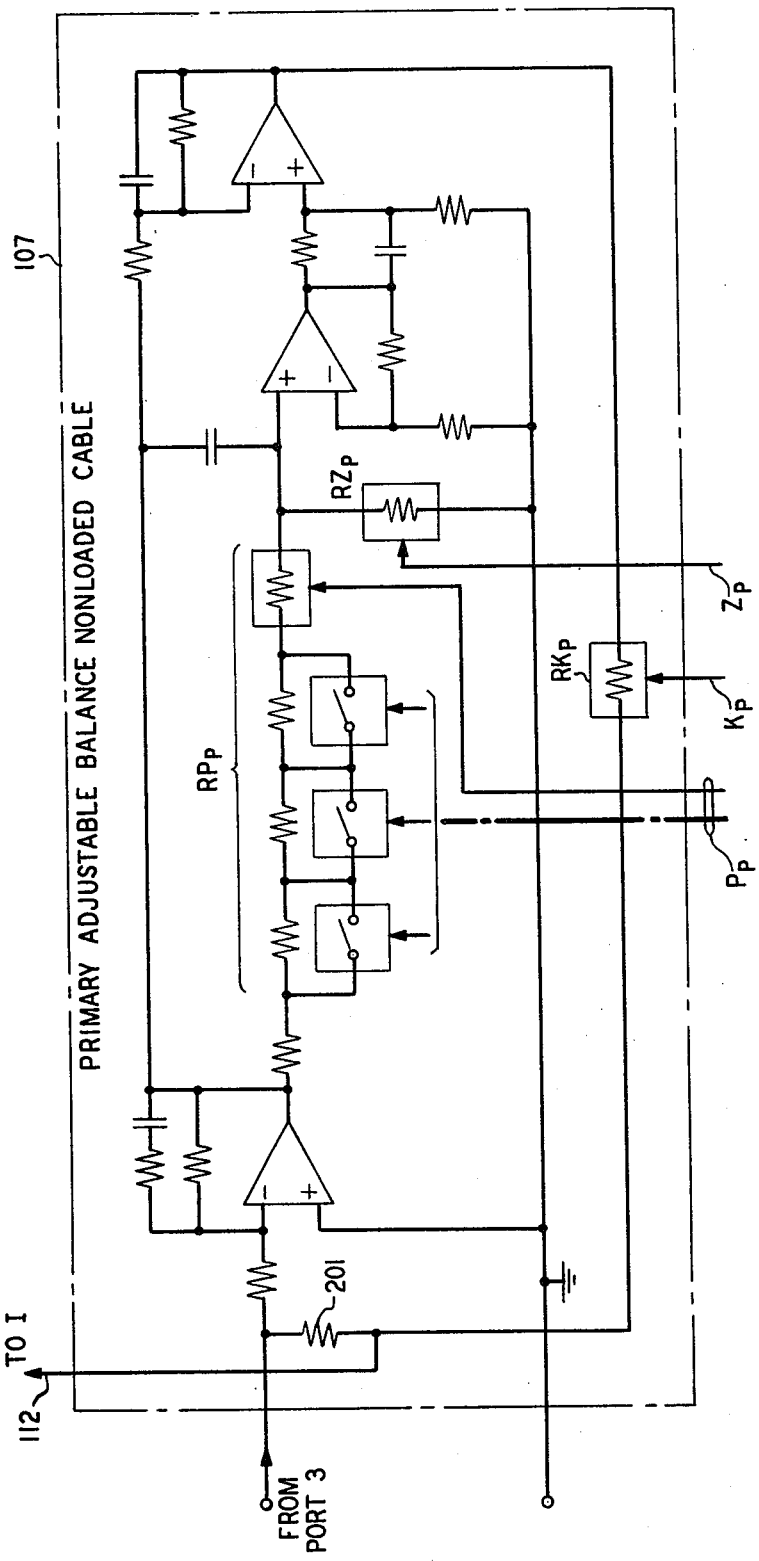
FIG. 2 shows details of the primary adjustable balance network of FIG. 1 for non-loaded cable.

Primary adjustable balance network 107 is an active circuit which yields a driving point impedance for matching the complex impedance of bidirectional cable 102. In this example, it is assumed that bidirectional cable 102 is of the 2-wire non-loaded type telephone cable. Details of one such adjustable balance network for non-loaded cable are shown in FIG. 2. The network of FIG. 2 has a variable scalar multiplier controlled by $RK_P$, a variable real pole controlled by $RP_P$ and a variable real zero controlled by $RZ_P$. It also includes a fixed real pole and a fixed real zero. This balance network is of a type employed to match the impedance of non-loaded telephone cable and is essentially identical to a network shown in FIG. 3 of the Daryanani patent cited above and described therein. The only difference between the network shown in the Daryanani patent and the network shown in FIG. 2 herein being that $RK_P$, $RP_P$ and $RZ_P$ are controllably variable impedances, for example, resistors which are adjusted in response to control signals $K_P$, $P_P$ and $Z_P$, respectively, generated by primary control 104, whereas the resistors in the network shown in the Daryanani patent are intended to be manually adjusted. Indeed, it is the purpose of this embodiment of the invention to generate discrete impedance values in binary form for setting up a Daryanani type balance network. Numerous arrangements known in the art may be employed to realize the adjustable impedances $RK_P$, $RP_P$ and $RZ_P$. As shown in FIG. 1, the control signals for adjusting $RP_P$ of FIG. 2 include a plurality of discrete signals and a continuously variable component. The discrete signals are binary values for selecting ones of switches 201, 202 and 203 which are thereby enabled or disabled to obtain the desired resistance value for $RP_P$, while the continuously adjustable resistor 204 is employed to obtain the exact resistance value required. The discrete binary value of control signal $P_P$ from primary control 104 is supplied to secondary adjustable balance network 110 to adjust corresponding resistance values as shown in FIG. 3.

Figure 5:
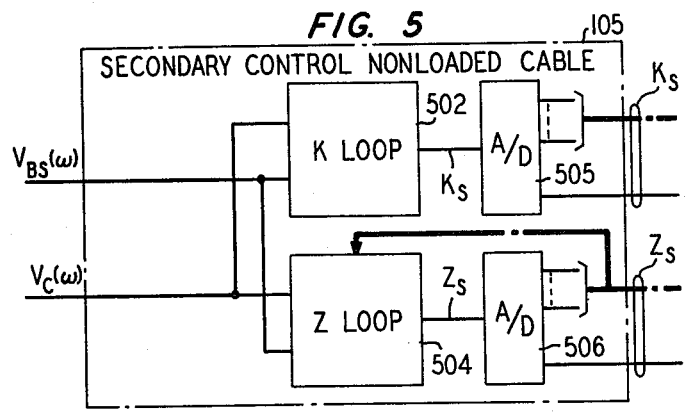
FIG. 5 shows details of the secondary control circuit of FIG. 1 for non-loaded cable.

Secondary control 105 (FIG. 1) responds to output $V_C(\omega)$ from sensing circuit 103 and to output $V_{BS}(\omega)$ from sensing circuit 115 to generate control signals $K_S$ and $Z_S$ for adjusting corresponding impedance elements in secondary adjustable balance network 110. Since the current supplied from current control 108 is essentially equal to that supplied to primary balance network 107 from hybrid 101 signal $V_{BS}$ is determined by the impedance of secondary balance network 110. Details of secondary control 105 are shown in FIG. 5 to be discussed below.

Sense circuit 115 (FIG. 1) also includes a bandpass filter to limit $V_{BS}(\omega)$ to the voice frequency band noted above.

FIG. 3 shows details of an adjustable balance network which may be employed for network 110 of FIG. 1. This network is essentially the same as that employed for primary balance network 107, the difference being that $RP_S$ includes only three switchable resistors while $RK_S$ includes a plurality of switchable resistors and one continuously adjustable resistor, and $RZ_S$ also includes a plurality of switchable resistors and a continuously adjustable resistor to effect the desired secondary adjustment. Here again control signals $K_S$ and $Z_S$ from secondary control 105 include a plurality of discrete binary signals for selecting appropriate ones of the corresponding switchable resistors to effect the desired balance function and a continuous residue signal for adjusting the corresponding continuously adjustable resistor to obtain the desired exact impedance value for effecting a balance. Signal $V_C(\omega)$ supplied to control circuit 105 is developed at port 1 of hybrid 101 in response to the impedance of cable 102 and the impedance of primary balance network 107. Thus, since the current supplied to secondary balance network 110 from current control 108 is substantially equal to that supplied from hybrid 101 to balance network 107 and since control circuit 105 responds to signals $V_C(\omega)$ and $V_{BS}(\omega)$ for generating optimum values for $K_S$ and $Z_S$, network 110 also yields a driving point impedance which is substantially equal to the impedance of cable 102. However, because of the use of the discrete rounded-off value for $P_P$, namely $P_S$, and interaction of the impedances $RP_S$, $RK_S$ and $RZ_S$, the values for $K_S$ and $Z_S$ are different from the values $K_P$ and $Z_P$. Indeed they are generally different from the rounded off values of $K_P$ and $Z_P$.

Discrete binary values for $K_S$ and $Z_S$ from secondary control 105 and the binary value for $P_P$, namely $P_S$, from primary control 104 represent optimum compromise discrete values. These binary values are supplied to display unit 120 which yields a visual display of functions P, K and Z in binary form to be utilized by a craftsperson for manually setting an adjustable balance network.

Thus, in operation, a craftsperson connects a test set including an embodiment of the invention to a particular bidirectional cable to which a hybrid including a balance network is to be connected. He then automatically obtains a visual display in binary form of optimum discrete impedance settings P, K and Z for the manually adjustable balance network to be connected to that particular cable. Consequently, exact knowledge of the cable characteristics is no longer needed and the balance network set-up procedure is greatly simplified.

FIG. 4 shows details of primary control 104 employed in FIG. 1. Primary control 104 is intended to be employed to generate control signals for adjusting a corresponding primary adjustable balance network intended for use in matching the impedance of non-loaded telephone cable. Accordingly, circuit 104 responds to signals $V_{BP}(\omega)$ and $V_C(\omega)$ to generate signals representative of control functions K, Z and P as defined in equations 1, 2 and 3, respectively. Thus, primary control 104 yields control signals $P_P$, $K_P$ and $Z_P$ for controlling corresponding controllable impedance elements in primary balance network 107. Signals $V_{BP}(\omega)$ and $V_C(\omega)$ are limited to a prescribed frequency band of interest as indicated above to minimize possible errors caused by unwanted spurious signals and the like which are outside the passband. In turn, signals $V_{BP}(\omega)$ and $V_C(\omega)$ are supplied to K loop circuit 402, P loop circuit 403 and Z loop circuit 404.

Circuit 402 responds to $V_{BP}(\omega)$ and $V_C(\omega)$ to generate a signal representative of control function $K_P$. To this end, $V_C(\omega)$ is supplied to positive absolute magnitude circuit 405, while $V_{BP}(\omega)$ is supplied to negative absolute magnitude circuit 406. The outputs from absolute magnitude circuits 405 and 406 are algebraically summed via resistors 407 and 408 to yield signal $VK_P$. Absolute magnitude circuits 405 and 406 may be any of those known in the art. Preferably, they are so-called precision magnitude circuits of a type employing operational amplifiers and diodes in appropriate feedback paths poled to obtain the desired positive or negative absolute magnitude function. See, for example, an article entitled "A Simple Absolute-Value Amplifier" *EDN*, June 20, 1974, page 78, for a positive absolute magnitude circuit. Signal $VK_P$ is supplied to an input of inverting amplifier 409. Capacitor 410 is connected in a feedback path between the output and input of amplifier 409 to form an integrator. Consequently, amplifier 409 yields a high gain to instantaneous changes in $VK_P$, as will be apparent to those skilled in the art. Preferably, amplifier 409 is a high gain differential amplifier of a type now commonly referred to as an operational amplifier. Thus, amplifier 409, summing resistors 407 and 408, and capacitor 410 form a summing integrator which in conjunction with absolute magnitude circuits 405 and 406 generate a control signal representative of function K of the optimizing criteria of equation 1.

P loop circuit 403 and Z loop circuit 404 are similar, the only difference being the characteristics of P filter 411 and Z filter 412. Each of circuits 403 and 405 include absolute magnitude circuits and a summing integrator which are identical to those used in K loop circuit 402. The difference between circuits 403 and 404, and circuit 402 being that the inputs to the absolute magnitude circuits are outputs from P filter 411 and Z filter 412, respectively.

Figure 6:
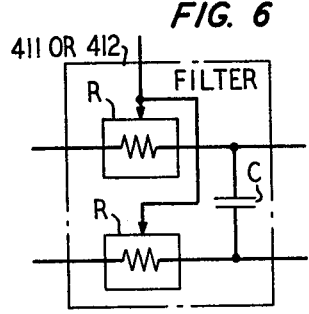
FIG. 6 shows details of the filter employed in the primary and secondary controls of FIGS. 4 and 5.

Referring briefly to FIG. 6, there is shown in simplified form details of filter 411 or 412. This filter is a balanced low-pass type including a variable or adjustable resistor R in each leg and capacitor C. As indicated in my co-pending application noted above this type filter, in conjunction with the absolute magnitude circuits and the summing integrator, when employed with signals $V_C(\omega)$ and $V_B(\omega)$ which are obtained at the output of bandpass filter 401 of control circuit 104 in response to the Gaussian noise signal from source 106 (FIG. 1) and by defining $e$ to be ½ RC (FIG. 6), it can be shown that $VP_P$ and $VZ_P$ (FIG. 4) may be expressed $$V \approx \int_{\omega_1}^{\omega_2} \left[ \left[ |\vec{V}_C(\omega)| - |\vec{V}_B(\omega)| \right] W_5 - \kappa V_1 \theta(\omega) W_6 \right] d\omega \quad (4)$$

where $W_5 = e/(\omega^2+e^2)$, $W_6 = \omega/(\omega^2+e^2)$, and $e$ is either Z or P.

Equation 4 is substantially the same as the desired optimizing functions for Z and P expressed in equations 2 and 3, respectively. A single frequency signal source may also be employed in particular applications if desired. However, for optimum adjustment over the frequency band of interest the signal supplied to port 2 of hybrid 101 (FIG. 1) should include a plurality of frequency components in the band of interest.

Returning to FIG. 4, P filter 411 is employed with corresponding magnitude and summing integrator arrangements to yield a signal representative of function $P_P$. Filter 411 includes prescribed impedance values for R and C (FIG. 6) selected to realize a range of real pole values in the weighting functions $W_3$ and $W_4$ of equation 3. Similarly, Z filter 412 is employed in conjunction with the associated magnitude circuit and summing integrator circuit to yield a signal representative of control function $Z_P$. Here again, the component values employed in filter 412 are selected to obtain a range of values of Z of the weighting function $W_1$ and $W_2$ of equation 2.

Since during the adjustment process, the frequency ($\omega = 2\pi f$) locations of the real pole and real zero vary as the impedances of primary adjustable balance network 107 (FIG. 1) are varied, the weighting functions for the pole and zero functions should also be varied further to optimize the control functions $V_P$ and $Z_P$, respectively. This is achieved by using variable impedance elements in each of filters 411 and 412 which respond to corresponding outputs $P_P$ and $Z_P$, respectively. In practice, the time constants of filters 411 and 412 are adjusted to track outputs $P_P$ and $Z_P$, respectively. As indicated in equation 4, $e = \frac{1}{2}$ RC and $e = P$ or $Z$. Consequently, if P or Z varies RC must also vary. In this embodiment the output from P loop circuit 403 is supplied to A-to-D converter 420 which yields a plurality of outputs in binary form plus a continuously variable residue signal. The binary bits represent a rounded off value while the residue signal is the difference, positive or negative, between the rounded off value and actual value of $P_P$. The binary bits are supplied to P filter 411 where they are employed in conjunction with a decoder circuit (not shown) to generate signals for controlling a plurality of switching elements which either switch in or out various resistance values for resistors R in order to track output signal $P_P$. Z filter 412 functions in a manner similar to that of P filter 411 except that an A-to-D converter (not shown) would also be included in the Z filter. In a particular embodiment a digital decoder arrangement is employed in filters 411 and 412 which responds to digital outputs of a corresponding A-to-D converter to control field effect transistor elements to insert resistors (R) of appropriate value in the legs of the balanced filter of FIG. 6. Moreover, in one example from experimental practice, it has been determined that Z filter 412 employed in generating real zero control signal $Z_P$ may have a fixed compromise characteristic. The component values for R and C (FIG. 6) are selected such that the location of Z in the weighting functions $W_1$ and $W_2$ of equation 2 is selected to be the square root of the product of $(Z_1) \times (Z_2)$, where $Z_1$ and $Z_2$ are the minimum and maximum zero locations, respectively, in the frequency range $\omega_1$ to $\omega_2$.

Analog-to-digital converter 420 preferably includes an analog-to-Gray code converter (not shown) of a type which yields a plurality of bits from most significant to least significant and analog residue value ER which is representative of the difference, positive or negative, between the least significant bit and the actual value of the analog quantity being converted. The Gray code bits are then converted to binary form while the residue signal is amplified and poled to yield an analog signal. Thus, the converter yields a plurality of binary bits representative of the rounded-off analog value plus an analog residue. One such analog-to-Gray code converter is disclosed in U.S. Pat. No. 3,187,325 issued to F. D. Waldhauer on June 1, 1965. A Gray-to-binary code converter which may be employed in this embodiment is described in my co-pending application, Ser. No. 665,332 filed Mar. 9, 1976, now U.S. Pat. No. 4,055,841 issued on Oct. 25, 1977.

FIG. 5 shows details of secondary control circuit 105 which generates signals to adjust secondary adjustable balance network 110. Balance network 110 is also of a type employed to balance non-loaded telephone cable. Accordingly, signals $V_{BS}(\omega)$ and $V_C(\omega)$ which are limited to a desired frequency band are supplied to inputs of K loop circuit 502 and Z loop circuit 504. K loop circuit 502 and Z loop circuit 504 are essentially identical to loop circuits 402 and 404, respectively, (FIG. 4). The only difference being that the output of K loop circuit 502 is supplied to A-to-D converter 505 while the output from Z loop circuit 504 is supplied to A-to-D converter 506. A-to-D converters 505 and 506 are essentially identical to converter 420 (FIG. 4). Consequently, A-to-D converter 505 generates a plurality of binary outputs representative of the rounded off amplitude of the function $K_S$ and a residue signal representative of the difference between the least significant binary bit of the binary signal and the analog value being converted. Similarly, A-to-D converter 506 yields a plurality of binary outputs representative of the rounded off value of function $Z_S$ and a residue signal representative of the difference between the least significant binary bit and the analog value being converted. Here again the output from A-to-D converter 506 is shown as being fed back to Z loop circuit 504 to adjust a corresponding Z filter to track the $Z_S$ output. In an application from experimental practice, it has been determined that the Z filter of Z loop 504 may also be of a compromise type described above in conjunction with Z loop 404, namely filter 412.

Figure 7:
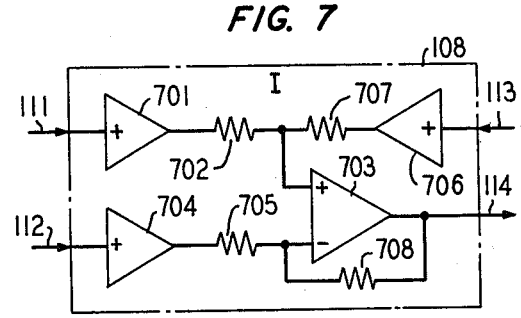
FIG. 7 shows details of current control circuit I of FIG. 1.

FIG. 7 shows in simplified form details of current control 108 employed in FIG. 1. Current control 108 is used to supply a signal via circuit path 114 to secondary adjustable balance network 110 (FIG. 1). The supplied signal is substantially a replica of a signal supplied from port 3 of hybrid 101 to primary balance network 107. This is achieved by sensing the potential developed across resistor 201 (FIG. 2) in primary balance network 107 and the potential developed across resistor 301 (FIG. 3) in secondary balance network 110. The resistance values of resistors 201 and 301 are equal. To this end, the potential supplied from port 3 of hybrid 101 is supplied via circuit path 111, buffer amplifier 701, and summing resistor 702 to a non-inverting input of amplifier 703. Similarly, the potential developed at the circuit connection of circuit path 112 to resistor 201 is supplied via buffer amplifier 704 and resistor 705 to an inverting input of amplifier 703. Resistor 708 is connected between the output and inverting input of amplifier 703 to establish a predetermined gain. The potential developed across resistor 301 at the circuit connection of circuit path 113 is supplied via buffer amplifier 706 and summing resistor 707 to the non-inverting input of amplifier 703. Because of the phase relationship of the several signals supplied to current control 108 it will be apparent to those skilled in the art that the signal generated at the output of amplifier 703 and supplied to secondary balance network 110 via circuit path 114 is essentially identical to the signal supplied from port 3 and via circuit path 111 to current control 108.

Figure 8:
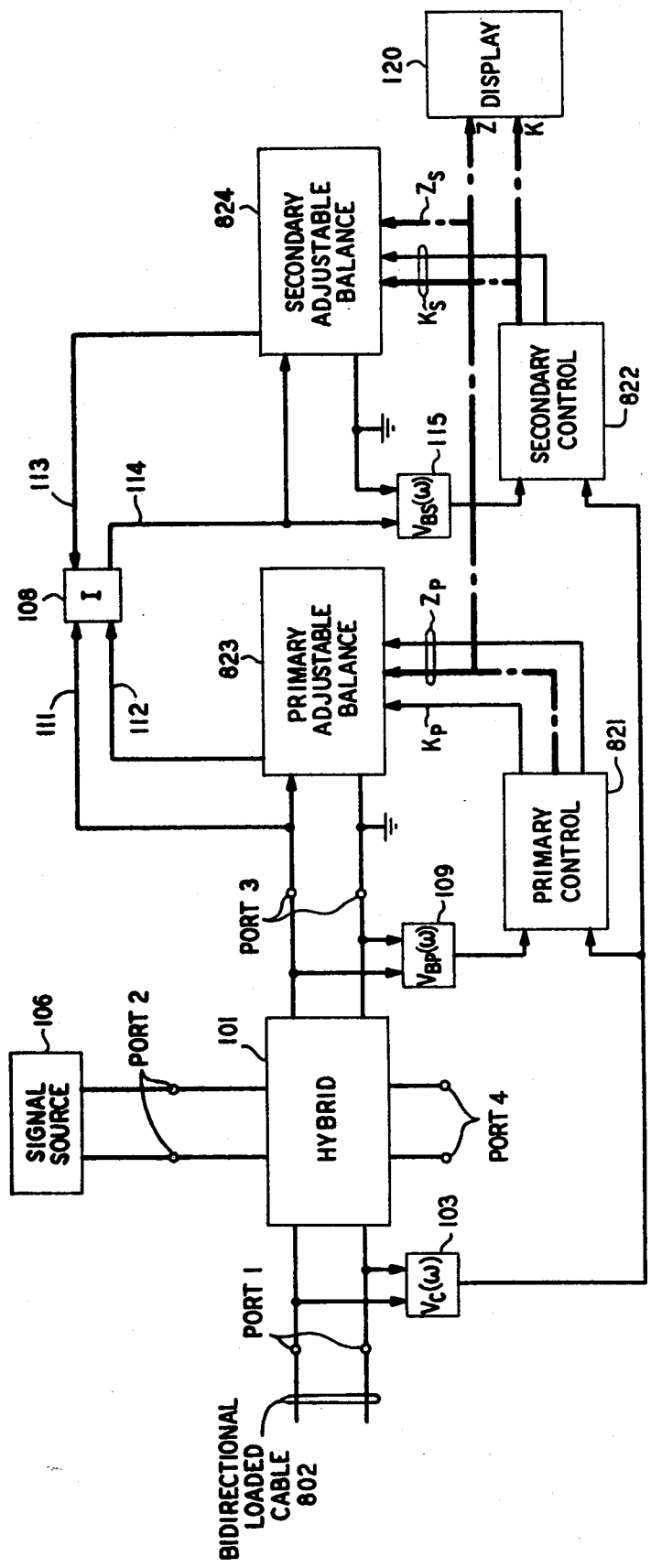
FIG. 8 shows in simplified block diagram form a second embodiment of the invention for yielding impedance settings to adjust a balance network having two variables.

FIG. 8 shows in simplified block diagram form a second embodiment of the invention for generating prescriptive impedance settings to adjust a balance network having only two variables. One such balance network is of a type employed to balance a hybrid network intended to be connected to a bidirectional telephone cable of the loaded type. The basic configuration of the embodiment shown in FIG. 8 is essentially identical to that shown in FIG. 1 except that primary control 821 generates only two control signals, primary adjustable balance network 823 and secondary adjustable balance network 824 only have two variable impedance elements, secondary control 822 generates only one control signal and port 1 of hybrid 101 is adapted or intended to be connected to loaded bidirectional cable 802. Operation of the embodiment shown in FIG. 8 is otherwise essentially identical to the operation of the embodiment shown in FIG. 1 to yield a visual indication on display 120 of variables K and Z to be employed in adjusting a balance network for matching a hybrid when connected to bidirectional cable 802.

Figure 9:
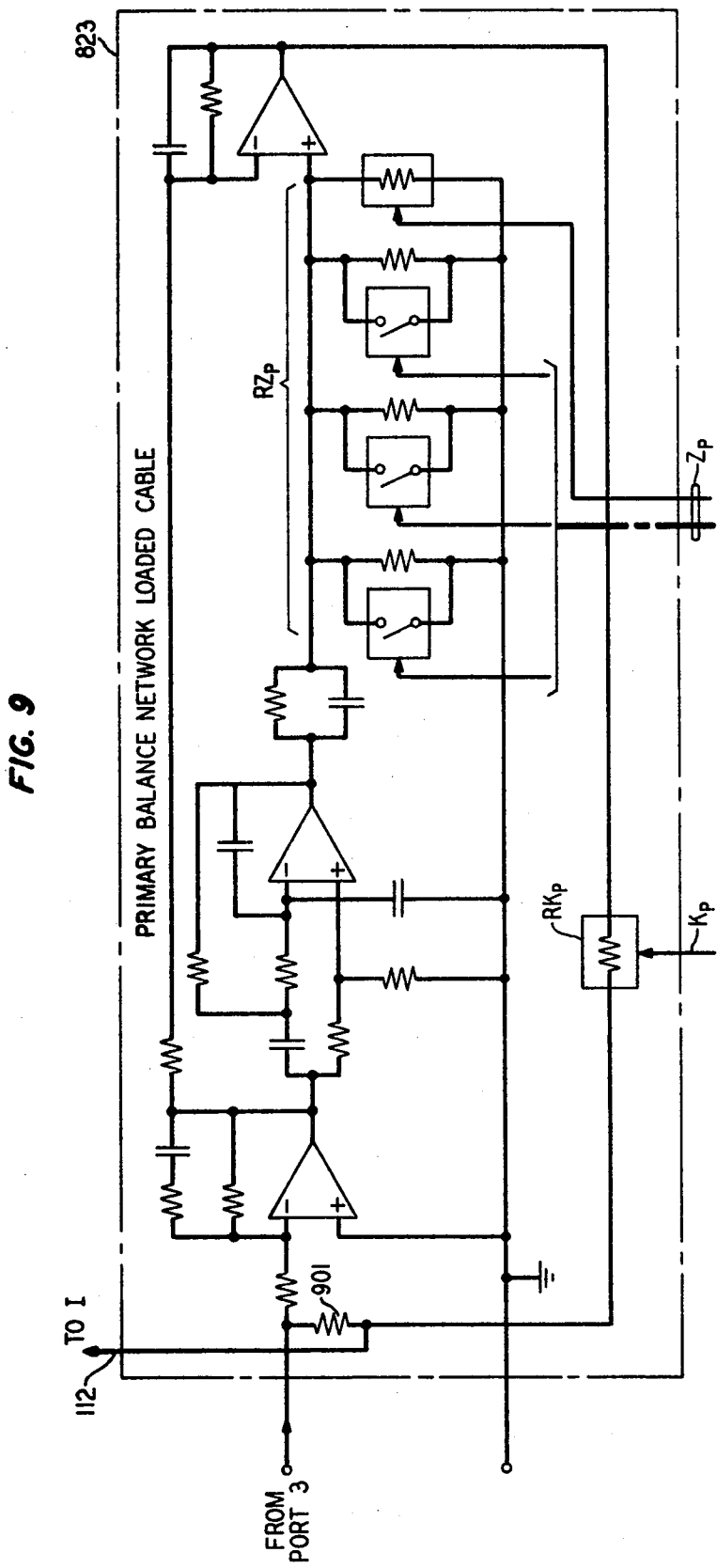
FIG. 9 shows details of the primary balance network employed in FIG. 8 for loaded cable.

FIG. 9 shows details of primary balance network 823 intended for use in generating prescription settings for a manually adjustable balance network intended for use with loaded 2-wire telephone cable. Balance network 823, however, only has a variable scalar multiplier controlled by $RK_P$ and a variable real zero controlled by $RZ_P$. Again, this balance network is of a type employed to match the impedance of loaded telephone cable and is essentially identical to a network shown in FIG. 6 of U.S. Pat. No. 3,919,502 cited above and described therein. The only differences between the network shown in the Daryanani patent and the network shown in FIG. 9 are that $RK_P$ and $RZ_P$ are controllably variable impedances, for example, resistors which are adjusted in response to control signals $K_P$ and $Z_P$, respectively, generated by primary control 821. The potential developed across resistor 901 is supplied via circuit path 112 to current control circuit 108 for purposes described above in relation to FIG. 1.

Figure 10:
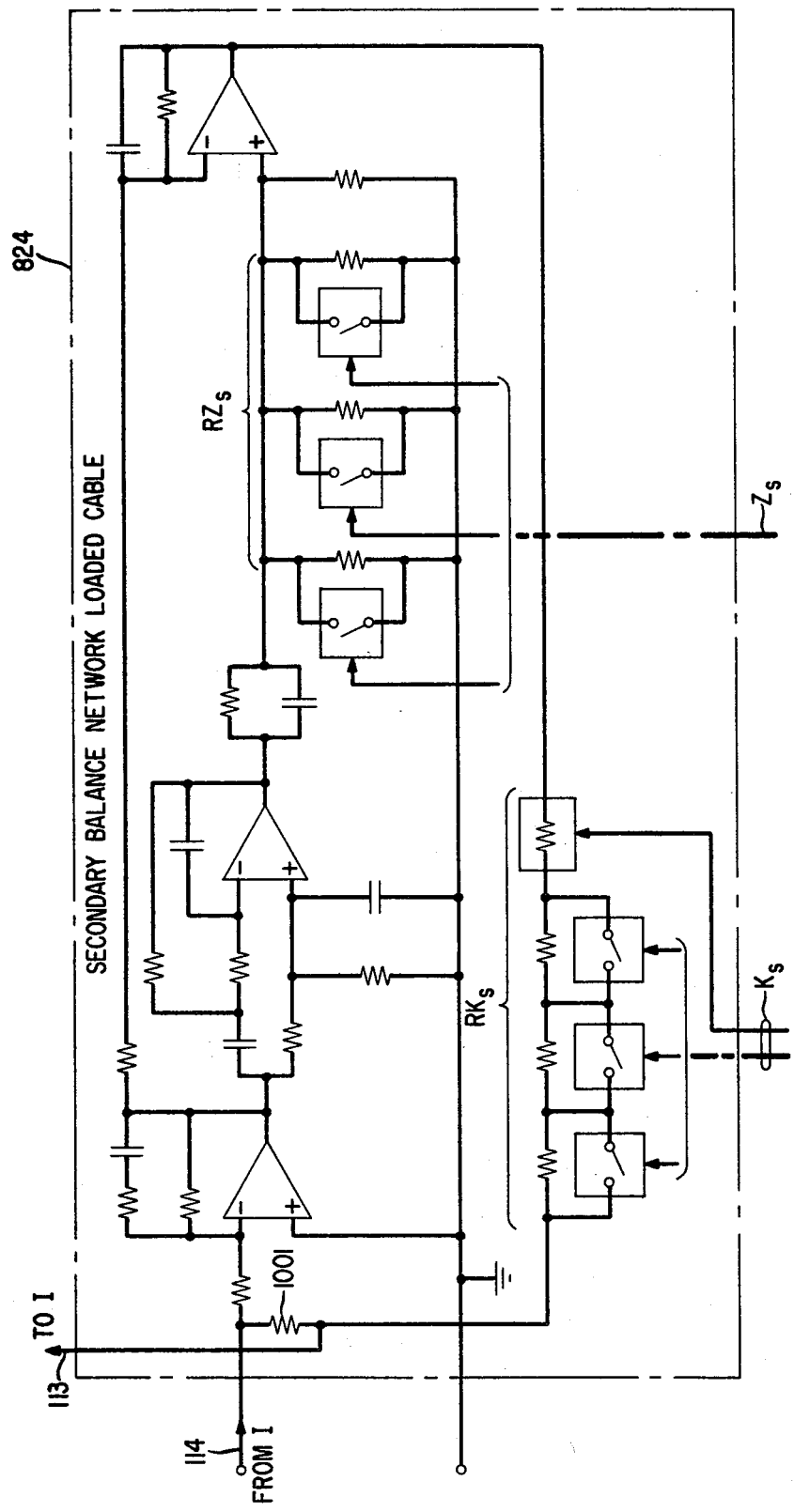
FIG. 10 shows details of the secondary balance network employed in FIG. 8 for loaded cable.

FIG. 10 shows details of secondary balance network 824 employed in FIG. 8. Secondary balance network 824 is essentially identical to primary balance network 823 except that the impedance adjustment for the scalar multiplier $RK_S$ includes a plurality of switch controlled resistors and a continuous residue resistor while the impedance elements for controlling the real zero $RZ_S$ includes only a plurality of switched controlled resistors. A potential developed across resistor 1001 is supplied via circuit path 113 to current control 108 for purposes as described above in relation to FIGS. 1 and 7.

Figure 11:
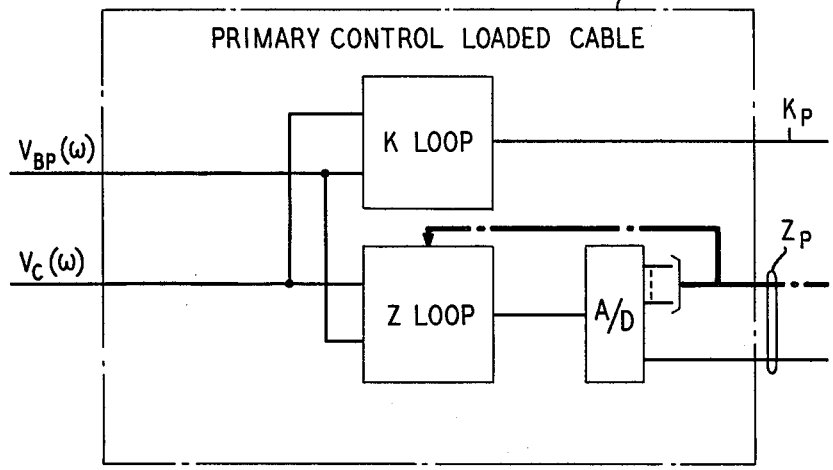
FIG. 11 shows the primary control employed in FIG. 8 for loaded cable.

FIG. 11 shows in simplified block diagram form details of primary control 821 employed in the embodiment of FIG. 8. The circuit elements employed in primary control 821 are essentially identical to those used in either primary control 104 or secondary control 105 and shown in FIG. 4 and FIG. 5, respectively. It will be apparent to those skilled in the art how the elements of control 104 and/or control 105 should be employed in the arrangement shown in FIG. 11 to effect the desired control functions for loaded cable. Accordingly, there will be no further discussion of those elements here.

Figure 12:
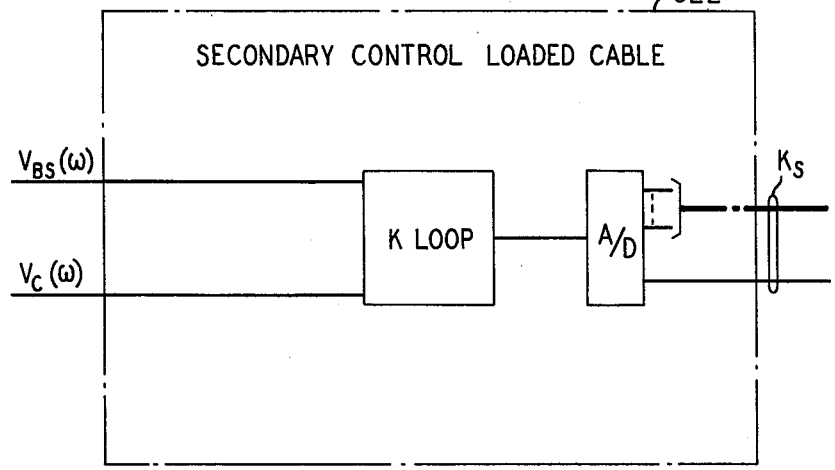
FIG. 12 shows details of the secondary control employed in FIG. 8 for loaded cable.

FIG. 12 shows in simplified block diagram form details of secondary control 822 employed in the embodiment shown in FIG. 8. Here again the elements of secondary control 822 shown in FIG. 12 are essentially identical to the K loop arrangement shown in FIG. 5 and, therefore, will not be discussed again.

The above described arrangements are, of course, merely illustrative of the application of the principles of this invention. Numerous other arrangements may be devised by those skilled in the art without departing from the spirit and scope of the invention. Indeed, although the embodiments of the invention discussed herein show arrangements for obtaining prescriptive impedance settings to adjust manually balance networks having two or three variables, the principles of the invention may be readily expanded to yield prescription settings for any desired number of variables by employing additional adjustable balance networks and additional control circuits in a manner which will be apparent to those skilled in the art upon reading the specification. Moreover, the principles of the invention are equally applicable for yielding a measure of unknown impedances other than telephone cables.

What is claimed is:

1. Apparatus for automatically obtaining settings to adjust manually controllable impedance elements for obtaining an optimum driving point impedance to match substantially an unknown impedance comprising:

a hybrid network having four signal ports, a first port of said hybrid network being adapted to be connected to the unknown impedance to be matched;

a signal source for generating a test signal having at least one frequency component in a predetermined frequency band and being connected to a second port of said hybrid network;

a first adjustable impedance balance network having a plurality of controllably adjustable impedance elements and being connected to a third port of said hybrid network;

a first control circuit connected in circuit relationship with said first hybrid port and said third hybrid port and being responsive to first and second signals developed at said first and third ports, respectively, in response to said test signal, said unknown impedance and said first balance network impedance for generating a plurality of first control signals for adjusting corresponding ones of said impedance elements of said first balance network for yielding at said third port a driving point impedance to match substantially said unknown impedance;

at least a second adjustable impedance balance network having a plurality of controllably adjustable impedance elements and an input, said input being in circuit relationship with said third hybrid port and being supplied with a signal representative of the current input to said first balance network and with a rounded off value of a predetermined one of said first control signals to adjust a corresponding one of said impedance elements in said at least second balance network; and at least a second control circuit responsive to said first signal developed at said first hybrid port and to a third signal developed at the input to said at least second balance network in response to the current supplied thereto and the impedance of said at least second balance network for generating second control signals to adjust the remaining ones of said at least second balance network controllably adjustable impedance elements for yielding at said at least second balance network input an otpimum compromise driving point impedance to match substantially said unknown impedance, wherein rounded off values of said predetermined one of said first control signals and said second control signals represent discrete impedance values for adjusting a corresponding manually adjustable balance network to yield an impedance to match substantially said unknown impedance.

2. Apparatus as defined in claim 1 wherein said first balance network includes at least first and second controllably adjustable impedance elements corresponding to a first magnitude control and a first singularity control, respectively, and said first control circuit includes means responsive to said first and second signals for generating at least a first magnitude control signal and a first singularity control signal in accordance with prescribed criteria.

3. Apparatus as defined in claim 2 wherein said first singularity control signal generating means includes means for generating a signal representative of a rounded off value of said first singularity control signal and means for generating a residue signal representative of the difference between said rounded off value and the substantially exact value of said first singularity control signal.

4. Apparatus as defined in claim 3 wherein said at least second balance network includes at least first and second controllably adjustable impedance elements corresponding to a second magnitude control and a second singularity control, respectively, said second singularity control responds to said rounded off value of said first singularity control signal for adjusting said second controllably adjustable impedance element to a discrete value, and wherein said at least second control circuit includes means responsive to said first and third signals for generating at least a second magnitude control signal.

5. Apparatus as defined in claim 4 wherein said second magnitude control signal generating means includes means for generating a signal representative of a rounded off value of said second magnitude control signal and means for generating a residue signal representative of the difference between said rounded off value and the substantially exact value of said second magnitude control signal and wherein said second magnitude control includes impedance elements responsive to said rounded off value for yielding a discrete impedance value and a continuously adjustable impedance element responsive to said residue signal, wherein the discrete impedance value and the continuously adjustable impedance value equal substantially the exact impedance value for said second magnitude control.

6. Apparatus as defined in claim 5 wherein said first balance network further includes at least a third controllably adjustable impedance element corresponding to a third singularity control and said first control circuit includes means responsive to said first and second signals further to generate a third singularity control signal in accordance with a prescribed criteria, said at least second balance network further includes at least a third controllably adjustable impedance element correresponding to a fourth singularity control, said at least second control circuit includes means responsive to said first and third signals for generating a fourth singularity control signal in accordance with prescribed criteria, and said fourth singularity control generating means includes means for generating a signal representative of a rounded off value of said fourth singularity control signal and means for generating a residue signal representative of the difference between said rounded off value and the substantially exact value of said fourth singularity control signal.

7. Apparatus as defined in claim 6 wherein said means for generating the rounded off values of said first singularity control signal, said second magnitude control signal, and said fourth singularity control signal each include means for yielding said rounded off signals in binary form, wherein said rounded off values in binary form represent impedance adjustments for corresponding impedance elements in a manually adjustable balance network.

8. Apparatus as defined in claim 7 wherein said signal source has a first prescribed output impedance and wherein a second prescribed impedance terminates said fourth port of said hybrid network.

9. Apparatus as defined in claim 8 wherein said signal source includes means for generating a signal having a plurality of frequency components in said predetermined frequency band.

10. Apparatus as defined in claim 9 further including means in circuit with said third port of said hybrid network and in predetermined circuit relationship with said first balance network and said second balance network for controllably generating said current input to said second balance network to equal the current input to said first balance network from said third hybrid port.

11. Apparatus as defined in claim 10 wherein said signal source means includes a noise source, said first prescribed impedance is substantially zero, said second prescribed impedance is substantially infinite, for example, an open circuit, and further including means for limiting the frequency of signals supplied to said control circuits to be within said predetermined frequency band.

* * * * *